US007690500B2

(12) United States Patent
Coers et al.

(10) Patent No.: US 7,690,500 B2
(45) Date of Patent: Apr. 6, 2010

(54) HYBRID DRAPER BELT SPLICE

(75) Inventors: Bruce A. Coers, North Hillsdale, IL (US); Sheldon J. Grywacheski, Humboldt (SK); Benjamin M. Lovett, Colona, IL (US); Corwin Marcus Raymond Puryk, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/261,364

(22) Filed: Oct. 30, 2008

(65) Prior Publication Data

US 2009/0194392 A1 Aug. 6, 2009

Related U.S. Application Data

(60) Provisional application No. 61/025,049, filed on Jan. 31, 2008.

(51) Int. Cl.
*B65G 15/30* (2006.01)

(52) U.S. Cl. .................... 198/844.2; 198/699; 474/253; 56/181

(58) Field of Classification Search .............. 198/844.2, 198/698, 699; 474/253–258; 53/181–188
See application file for complete search history.

(56) References Cited

U.S. PATENT DOCUMENTS

| | | | | |
|---|---|---|---|---|
| 4,906,226 | A * | 3/1990 | Hecker et al. | 474/257 |
| 5,136,832 | A * | 8/1992 | Sund | 56/364 |
| 6,216,849 | B1 * | 4/2001 | Sytema | 198/731 |
| 6,238,131 | B1 | 5/2001 | Watts et al. | |
| 6,467,988 | B1 * | 10/2002 | Czachor et al. | 403/337 |
| 6,471,045 | B1 * | 10/2002 | Harden | 198/817 |
| 7,070,042 | B2 * | 7/2006 | Dow et al. | 198/835 |
| 7,344,020 | B2 * | 3/2008 | Grywacheski et al. | 198/844.2 |

FOREIGN PATENT DOCUMENTS

| | | | |
|---|---|---|---|
| DE | 2808244 | A1 | 8/1979 |
| EP | 1561713 | A | 8/2005 |
| GB | 1602067 | A | 11/1981 |

OTHER PUBLICATIONS

European Search Report dated Jun. 24, 2009, (6 pages).

* cited by examiner

*Primary Examiner*—Mark A Deuble
(74) *Attorney, Agent, or Firm*—Taylor & Aust, PC

(57) ABSTRACT

A connector assembly for a draper belt in a harvesting machine having first and second connecting bars on opposite first and second sides of belt end flanges and a flat belt splice along the leading or trailing edge of the draper belt. By providing a flat belt splice along the leading edge, the draper belt can be located underneath a belt cover to prevent grain from leaking out onto the ground.

20 Claims, 3 Drawing Sheets

HYBRID DRAPER BELT SPLICE

CROSS REFERENCE TO RELATED APPLICATIONS

This is a non-provisional application based upon U.S. provisional patent application Ser. No. 61/025,049 entitled "HYBRID DRAPER BELT SPLICE", filed Jan. 31, 2008, which is incorporated herein by reference.

FIELD OF THE INVENTION

The present invention relates to platforms for harvesting machines that have a draper belt for conveying crop material, and, in particular, to a connector assembly for coupling the ends of the draper belt together.

BACKGROUND OF THE INVENTION

Draper platforms for harvesting equipment have one or more flat, wide belts, referred to as a draper or a draper belt, to convey crop material. The arrangement and the number of belts vary among platforms. One style of platform has two side belts that convey crop material laterally to the center of the platform where a feed belt moves the crop material longitudinally into the harvesting machine. The draper belts have two ends that are joined together to form a continuous belt. At each end of the belt, an upstanding flange is provided. These belt end flanges are joined together by a connector assembly to form a continuous belt. The connector assembly serves as a transverse cleat which, together with other cleats formed along the belt length, functions to convey crop material in the direction of belt travel.

In this typical belt, the upstanding cleat extends substantially along the entire width of the belt from the leading edge to the trailing edge. See, for example, the arrangement of U.S. Pat. No. 6,238,131. When a belt cover is provided to hold down the leading edge of the belt, the cleats get in the way and prevent a good seal between the cover and the belt.

What is needed in the art is a draper belt for a platform of a harvester that provides a good seal between a cover and the belt.

SUMMARY OF THE INVENTION

Accordingly, it is an object of the present invention to provide a connector assembly for the ends of a draper belt that provides a better seal between the belt and a belt cover than would be provided using a typical upraised cleat extending the entire width of the belt.

The invention in one form is directed to a platform for a harvesting machine including at least one crop conveying belt with opposite first and second ends joined together to form a continuous belt, the opposite first and second ends having mating upstanding flanges extending transverse to a direction of belt travel that are fixed together with first and second transversely extending connecting bars and a plurality of fasteners extending between the connecting bars and through the belt. Further, the belt ends, along a leading or trailing edge of the crop conveying belt, have abutting faces that are fixed together with a flat belt splice and a belt cover that extends substantially the entire width of the belt.

The invention in another form is directed to a conveying belt for use in a platform of a harvesting machine. The conveying belt includes a belt member having a crop conveying surface with opposite first and second ends joined together to form a continuous belt. The conveying belt also includes a leading edge and a trailing edge in a direction of belt travel. The opposite first and second ends have a first portion and a second portion. The second portion has abutting ends. The conveying belt also includes a connection device configured to removably secure the opposite ends of the first portion to each other in an overlapping manner. The connection device has a protrusion extending outwardly from the crop conveying surface. The conveying belt also includes a flat belt splice for removably fixing the abutting ends of the second portion together.

DETAILED DESCRIPTION OF THE INVENTION

Figure 1:
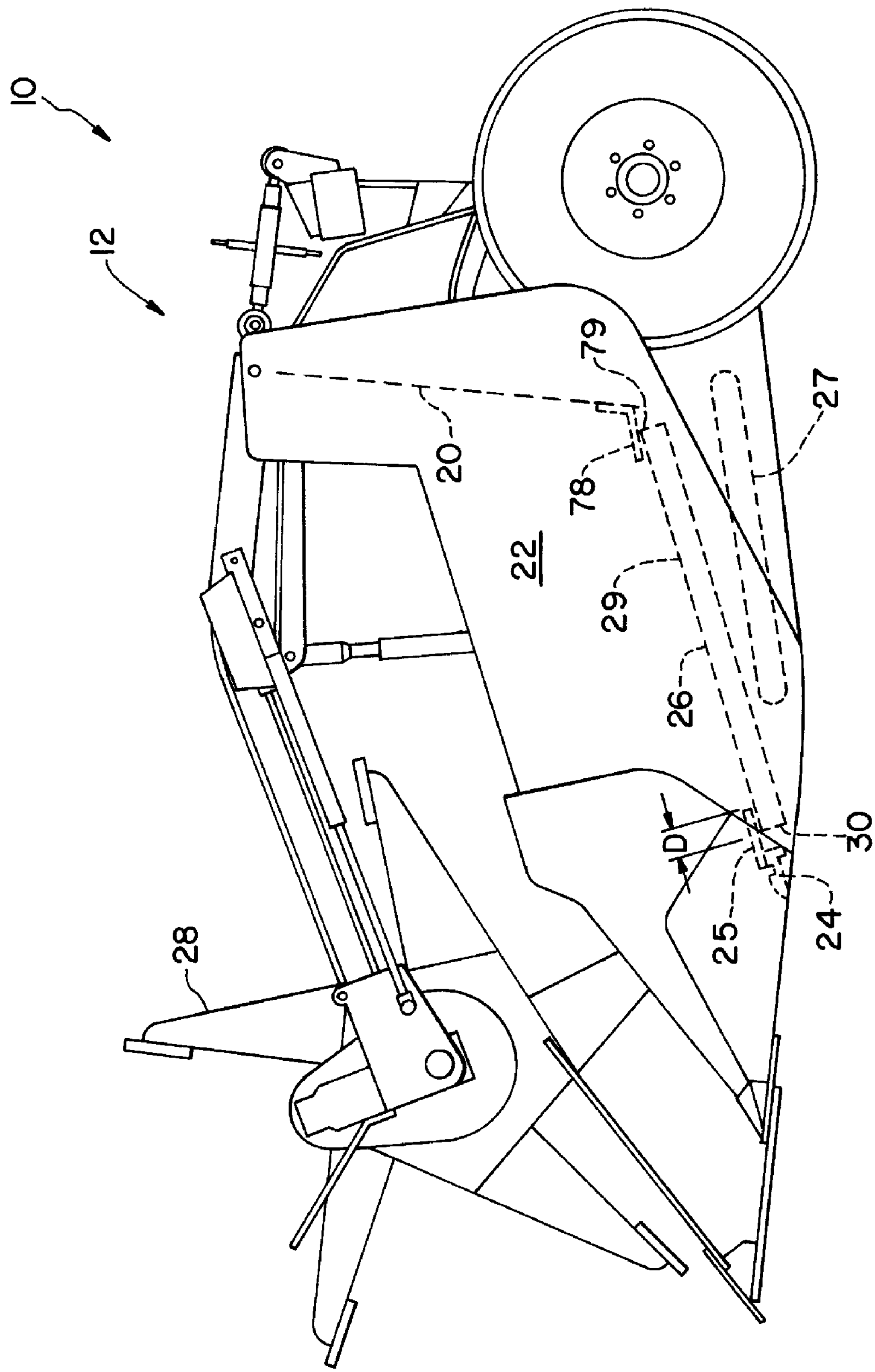
FIG. 1 is a side view of an embodiment of a draper platform of the present invention for use with a harvesting machine.

Referring now to the drawings and more particularly to FIG. 1, there is shown a grain cutting platform 12 of harvesting machine 10 shown in a side elevation. Platform 12 can be mounted to a harvesting machine feederhouse (not shown) in a conventional manner and has a basic open front structure that includes a rear wall 20, opposite side sheets 22, and a cutter bar 24 spaced forward of rear wall 20. One or more side draper belts 26 are provided between cutter bar 24 and rear wall 20 to convey crop material (not shown). One side draper belt 26 is positioned on the right side of grain cutting platform 12 and another side draper belt 26 is positioned on the left side of grain cutting platform 12. The side draper belts 26 are crop conveying belts having a crop conveying surface 29 on which the crop material moves laterally to a center feed draper belt 27. Center feed draper belt 27 moves the crop material longitudinally through an opening in rear wall 20 and into the harvesting machine feederhouse. The belt arrangement shown is only one example of the many belt arrangements that may be used.

A reel 28 rotates above cutter bar 24 to hold the crop material against cutter bar 24 and move cut crop material onto draper belts 26 and 27. A belt cover 25 extends substantially the entire width of platform 12 is disposed over leading edge 30 of side draper belts 26 and cutter bar 24 to prevent grain from leaking into a gap between cutter bar 24 and side draper belts 26 and being lost. To provide a good seal, cover 25 is spaced close to a leading edge 30 of side draper belt 26 and is preferably in abutting or sliding contact with side draper belts 26. Cover 25 extends rearward across leading edge 30 of side draper belts 26 a distance "D", preferably between 1 and 3 inches.

Draper belts 26 and 27 are wide, flat belts. The side and center draper belts 26 and 27 are generally the same, but typically differ at least in width and length. Typically, for simplicity, side draper belts 26 are identical for use on the right and left sides of platform 12. Side draper belts 26 for the right and left side of the platform 12 may, alternatively, be different from each other in length, width, or other dimensions.

Figure 2:
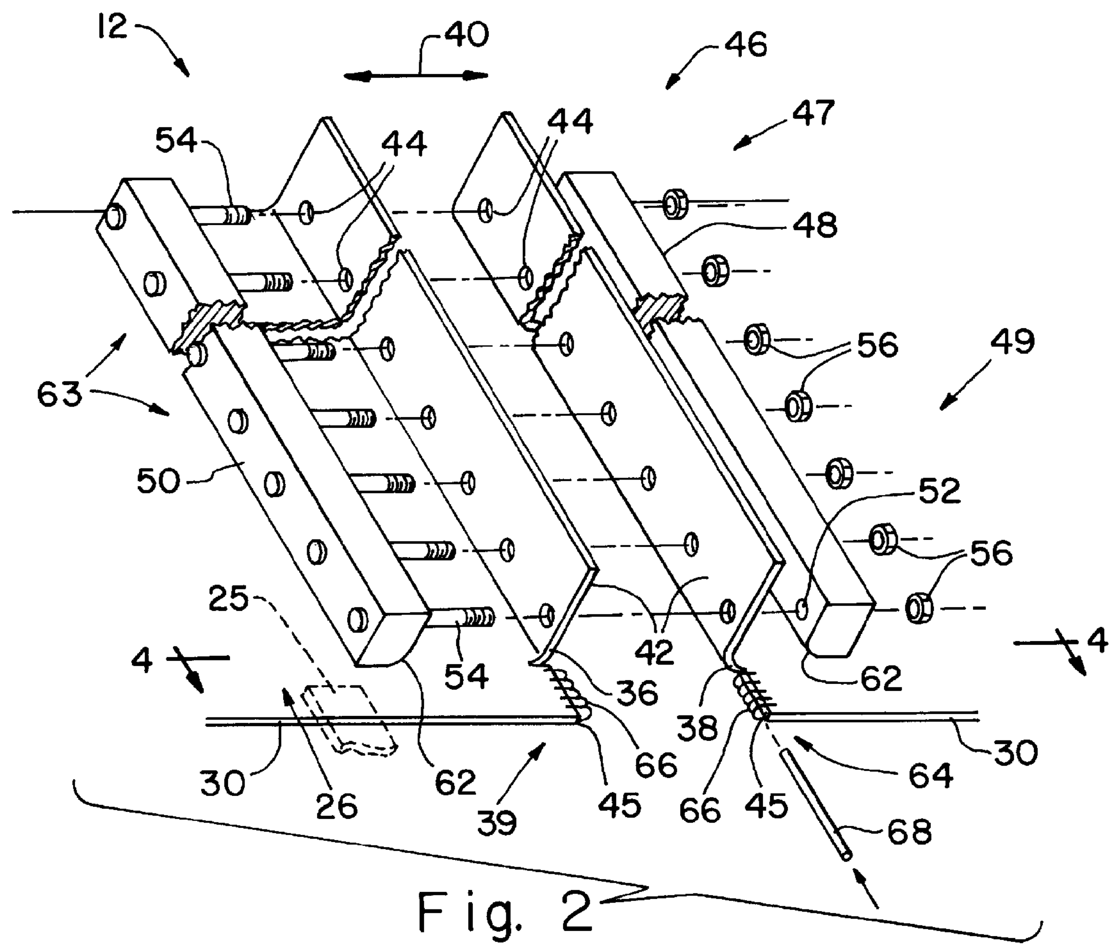
FIG. 2 is an exploded perspective view of the belt end connector assembly.

Now, additionally referring to FIG. 2, a side draper belt 26 to be used on the right or left side of the platform 12 is shown. Side draper belt 26 has opposite first and second belt ends 36 and 38 that are joined together to form a continuous belt 39.

Belt 26 is moved over rollers 76 (see FIG. 4) in a belt travel direction shown by an arrow 40 in FIG. 2. The direction of belt travel depends on whether belt 26 is placed on the right or the left side of platform 12.

Figure 3:
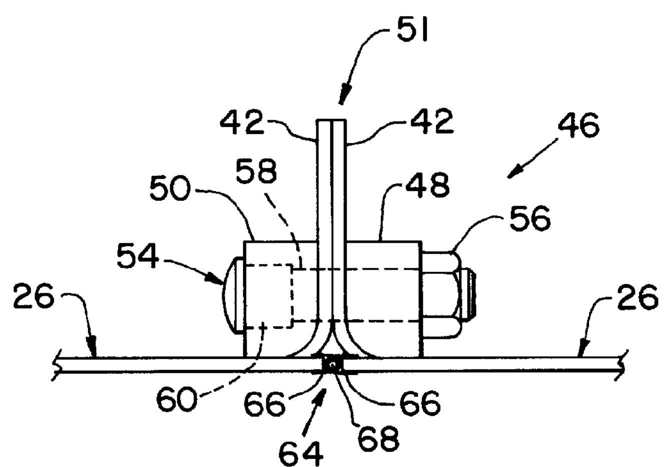
FIG. 3 is an assembled side view of the belt end connector assembly.

Now, additionally referring to FIG. 3, belt 26 has opposed first and second belt ends 36, 38 and includes a first portion 47 and a second portion 49. Belts ends 36 and 38 are held together by a belt end connector assembly 46. Belt end connector assembly 46 includes a flat belt splice 64 for connecting belt ends 36 and 38. As shown, flat belt splice 64 runs beneath cover 25. Flat belt splice 64 connects faces 45 of belt ends 36 and 38 at second portion 49 that are adjacent leading edge 30 of side draper belt 26. The face 45 of each of ends 36 and 38 abut each other. The words "abut each other" means that the faces 45 may be in physical contact with each other or may have a small gap or space between each other. A small gap of 0.00 to 0.20 inches between the faces may not be detrimental to flat belt splice 64 of belt 26.

Belt end connector assembly 46 also includes a connection device 63 for connecting belt ends 36 and 38 of side draper belt 26. Portion 47 of belt ends 36 and 38 of side draper belt 26 are connected in an overlapping manner. As such, each of the belt ends 36 and 38 have an upstanding belt end flange 42. Each of the two belt end flanges 42 have an array of apertures 44 that are aligned with one another when belt ends 36 and 38 are brought together. Connection device 63, as shown, is in the form of a first connecting bar 48 and a second connecting bar 50. Connecting bars 48 and 50 are substantially solid bars, preferably made of metal, and can be formed by extrusion. Other materials, including plastics may be used to construct connecting bars 48 and 50. Connecting bar 48 is provided with an array of through bores 52 that align with apertures 44 in belt end flanges 42.

Connecting bar 50 has a plurality of threaded studs 54 affixed thereto. Studs 54 project through apertures 44 in belt end flanges 42 and through bores 52 in connecting bar 48. Lock nuts 56 are threaded onto the distal ends of studs 54 to hold connecting bars 48 and 50 and the upstanding belt end flanges 42 together.

Studs 54 have a shaft 58, a portion 60 of which is knurled to grip second connecting bar 50 to hold studs 54 firmly in place. Studs 54 are press-fit into connecting bar 50, fixing them thereto. The fixing of studs 54 to connecting bar 50 eliminates the need for separate bolts that must otherwise be manually manipulated to insert the bolts through both connecting bars 48 and 50. Belt end connector assembly 46, uses fewer separate components than prior connector assemblies do. In addition, by utilizing lock nuts 56, lock washers are no longer needed, further reducing the number of separate fastener components to be assembled. Fixing studs 54 to connecting bar 50 also eliminates the need to use a second wrench on a bolt head of the stud to prevent rotation of the stud. As a result, assembly and disassembly of the connector assembly 46 is greatly simplified compared to other connector assemblies having separate bolts, nuts and lock washers.

As can be seen in FIG. 2, connecting bars 48 and 50 have a generally rectangular cross-sectional shape. One corner 62 of the four corners of connecting bars 48 and 50 engages side draper belt 26 at the base of belt end flanges 42. Corner 62 is more rounded than the other three corners of each of connecting bars 48 and 50. This provides a relief to belt 26 as the connector assembly 46 travels around rollers 76 (see FIG. 4), thereby supporting side draper belt 26. When fully assembled, connector assembly 46 forms a protrusion in the form of a cleat 51 raised from the flat surface of belt 26. This cleat helps to convey crop material along with the other cleats (not shown) typically formed with side draper belt 26. A substantially similar connector assembly is used with center draper belt 27 and may be lengthened or shortened to accommodate a different belt width for center draper belt 27.

Figure 4:
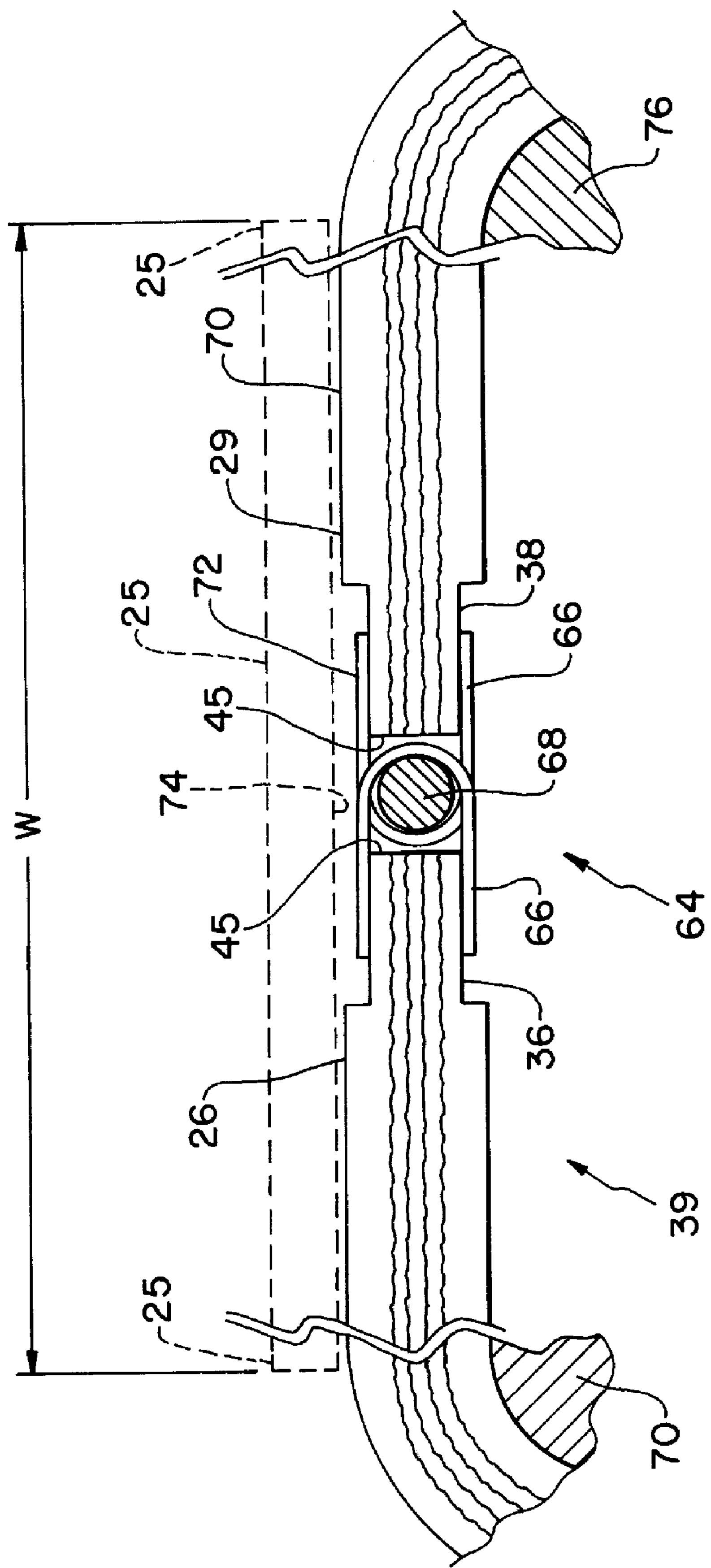
FIG. 4 is a cross-sectional view of the belt end connector assembly taken at section line 4-4 in FIG. 2.

Now, additionally referring to FIG. 4, leading edge 30 of each of belt ends 36 and 38 are disposed under cover 25 and are held together by flat belt splice 64. Flat belt splice 64 is preferably formed as a series of metal loops 66 that are fixed to the faces 45 of belt ends 36 and 38 of side draper belt 26 at the leading edge 30 of side draper belt 26. Flat belt splice 64 also includes a removable cylindrical rod 68 that extends through and couples metal loops 66. A wide variety of flat belt splices are suitable for use with connecting assembly 46. Several splices that are preferred are any of the flat belt splices (also known as "belt joints" or "belt lacing") made by Flexco Steel Lacing Company of Downers Grove, Ill., or Clipper Belt Lacing Company of Grand Rapids, Mich., for joining conveyor belt material together in an endless loop.

FIG. 4 shows a preferred arrangement of belt end connector assembly 46, in which top 72 of flat belt splice 64 is fixed to ends 36 and 38 of side draper belt 26. Flat belt splice 64 compresses ends 36 and 38 of the side draper belt 26 so that top 72 of flat belt splice 64 is positioned even with a free (uncompressed) upper surface 70 of crop conveying surface 29 (or slightly below the free upper surface 70) of side draper belt 26. In this arrangement, the belt 26 abuts underside 74 of cover 25 or a slight gap is provided between top 72 of flat belt splice 64 and underside 74 of cover 25. A gap (if provided) is particularly beneficial because it reduces wear of the splice 64 against cover 25, which can cause premature failure of flat belt splice 64 when flat belt splice 64 is disposed slightly above the surface 70 of side draper belt 26.

Side draper belt 26 in the form of continuous belt 39 defines a width W in the direction of travel. Belt cover 25 extends over substantially the entire width W of side draper belt 26, which is supported for rotation on rollers 76 disposed at either end of the endless loop defined by side draper belt 26. Belt cover 25 can be a single endless piece of material over its entire length, or it can be broken up into several individual pieces that abut each other or overlap each other on their ends in a shingled relation (not shown).

In the illustrated embodiment, cover 25 is disposed along the entire leading edge of side draper belt 26 to thereby seal the leading edge of side draper belt 26 including flat belt splice 64 to keep grain from leaking out along the leading edge of side draper belt 26.

Additionally, and as shown in FIG. 1, trailing edge belt cover 78, similar to cover 25, may extend substantially the entire width of platform 12 (with a break in the middle for the feederhouse opening). Trailing edge cover 78 may be provided at trailing edge 79 of side draper belt 26 to seal against grain leakage at the trailing edge 79 of side draper belt 26 in a manner similar to leading edge belt cover 25 that seals against leakage at the leading edge 30 of belt 26. This arrangement prevents grain from falling off the rear of the belt 26 and down between rear wall 20 of platform 12 and side draper belt 26. In this trailing edge cover arrangement, trailing edge 79 of belt 26 would have a flat belt splice substantially similar to the illustrated flat belt splice 64, that is disposed along the leading edge of side draper belt 26. In this embodiment, the flat belt splice 64 is covered by trailing edge cover 78 just as it is covered by leading edge cover 25 when disposed along the leading edge 30.

Flat belt splice 64 can be provided along the trailing edge of the belt, as well as, being provided along the leading edge of the belt. This permits the belt to be sealed against leading edge cover 25 along the leading edge of side draper belt 26 and trailing edge cover 78 along the trailing edge of the side draper belt 26. This two flat splice arrangement is not pictured herein, but would consist of a belt such as that illustrated in the Figures herein, but with a flat belt splice disposed along the trailing edge that is substantially similar to the flat belt splice 64 pictured herein as disposed along leading edge 30. Different widths of these two flat belt splices could be provided to accommodate a leading edge cover 25 that has a different front-to-back width than trailing edge cover 78.

Having described the preferred embodiment, it will become apparent that various modifications can be made without departing from the scope of the invention as defined in the accompanying claims.

What is claimed is:

1. A platform for a harvesting machine comprising:

at least one crop conveying belt with opposite first and second ends joined together to form a continuous belt, the opposite first and second ends having mating upstanding flanges extending transversely to a direction of belt travel that are fixed together with first and second transversely extending connecting bars and a plurality of fasteners extending between the connecting bars and through the crop conveying belt, the first and second ends, along one of a leading edge and a trailing edge of the crop conveying belt, further having abutting faces that are fixed together with a flat belt splice, the continuous belt defining a width in the direction of belt travel; and a belt cover that extends substantially the entire width of the crop conveying belt.

2. The platform of claim 1, wherein the flat belt splice further comprises a first plurality of loops formed in the first end of the belt and a second plurality of loops formed in the second end of the belt, wherein each of the first plurality of loops is configured to be interleaved with the second plurality of loops to define an aperture extending in a direction transverse to the direction of belt travel, and further wherein the aperture is configured to receive a rod to removably lace the first and second plurality of loops together in the flat belt splice.

3. The platform of claim 1 wherein the flat belt splice is between 1 and 3 inches wide.

4. The platform of claim 1, wherein the cover is disposed along one of the leading edge and trailing edge of the belt and is configured to seal against a top surface of the flat belt splice when the belt splice is driven to prevent grain from falling between the cover and the belt.

5. The platform of claim 1, wherein the connecting bars comprise substantially solid connecting bars.

6. The platform of claim 1, wherein the fasteners comprise threaded fasteners.

7. The platform of claim 1, wherein the fasteners are rigidly secured to one of the first and second connecting bars.

8. A harvesting machine comprising:

a harvesting machine feederhouse; and a platform including:

at least one crop conveying belt with a crop conveying surface, with opposite first and second ends joined together to form a continuous belt, and with a leading edge and a trailing edge in a direction of belt travel, the opposite first and second ends having a first portion and a second portion, the first portion of the opposite first and second ends being connected by a connection device securing the opposite first and second ends of the first portion to each other in an overlapping manner, the connection member having a portion thereof extend outwardly from the crop conveying surface, the second portion of the opposite first and second ends being positioned adjacent one of the edge leading and the trailing edge of the crop conveying belt, the second portion having abutting ends that are fixed together with a flat belt splice, and a belt cover that cooperates with the second portion of the belt.

9. The harvesting machine of claim 8, wherein the flat belt splice is between 1 and 3 inches wide.

10. The harvesting machine of claim 8, wherein the cover is disposed along one of the leading edges and the trailing edge of the belt and is configured to seal against the crop conveying surface of the flat belt splice when the belt splice is driven to prevent crop from falling between the cover and the belt.

11. The harvesting machine of claim 8, wherein the belt cover extends substantially the entire width of the belt.

12. The harvesting machine of claim 8:

wherein the first portion of the opposite first and second ends of the belt have mating upstanding flanges extending transversely to the direction of belt travel; and wherein the connection device includes:

first and second transversely extending connecting bars configured to conform to the upstanding flanges of the first portion of the opposite first and second ends of the belt, and a plurality of threaded fasteners extending between the connecting bars and through the upstanding flanges of the belt and configured to secure the bars to the belt.

13. The harvesting machine of claim 12, wherein the flat belt splice further comprises a first plurality of loops formed in the first end of the belt and a second plurality of loops formed in the second and opposite first and second end of the belt, wherein each of the first plurality of loops is configured to be interleaved with each of the second plurality of loops to define an aperture extending in a direction transverse to the direction of belt travel, and further wherein the aperture is configured to receive a rod to removably lace the first and second plurality of loops together in the flat belt splice.

14. The harvesting machine of claim 12, wherein the connecting bars comprise solid connecting bars.

15. A conveying belt for use in a platform of a harvesting machine, said conveying belt comprising:

A belt member having with a crop conveying surface, with opposite first and second ends joined together to form a continuous belt, and with a leading edge and a trailing edge in a direction of belt travel, the opposite first and second ends having a first portion and a second portion, the second portion having abutting ends;

a connection device configured to removably secure the opposite first and second ends of the first portion to each other in an overlapping manner, the connection device having a protrusion thereof extending outwardly from the crop conveying surface; and a flat belt splice for removably fixing the abutting ends of the second portion together.

16. The conveying belt of claim 15, wherein the flat belt splice further comprises a first plurality of loops formed in the first end of the belt member and a second plurality of loops formed in the second end of the belt member, wherein each of the first plurality of loops is configured to be interleaved with each of the second plurality of loops to define an aperture extending in a direction transverse to the direction of belt travel, and further wherein the aperture is configured to receive a rod to removably lace the first and second plurality of loops together in the flat belt splice.

17. The conveying belt of claim 15, wherein the flat belt splice is between 1 and 3 inches wide.

18. The conveying belt of claim 15, wherein the second portion is positioned adjacent one of the edge leading and the trailing edge of the belt member.

19. The conveying belt of claim 15:

wherein the first portion of the opposite first and second ends of the belt member have mating upstanding flanges extending transversely to a direction of belt travel; and wherein the connection device includes:

first and second transversely extending connecting bars configured to conform to upstanding flanges of the first portion of the opposite first and second ends of the belt member, and a plurality of fasteners extending between the connecting bars and through the upstanding flanges of the belt member.

20. The harvesting machine of claim 18, wherein the connecting bars comprise substantially solid connecting bars.

* * * * *